United States Patent
Luo et al.

(10) Patent No.: US 11,706,325 B2
(45) Date of Patent: Jul. 18, 2023

(54) ANGLE DETERMINING CIRCUIT, ANGLE DETERMINING METHOD, AND FOLDING SCREEN TERMINAL

(71) Applicant: VIVO MOBILE COMMUNICATION CO., LTD., Guangdong (CN)

(72) Inventors: Chunhui Luo, Chang'an Dongguan (CN); Quanzhong Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 335 days.

(21) Appl. No.: 17/207,422

(22) Filed: Mar. 19, 2021

(65) Prior Publication Data

US 2021/0211529 A1    Jul. 8, 2021

Related U.S. Application Data

(63) Continuation of application No. PCT/CN2019/099924, filed on Aug. 9, 2019.

(30) Foreign Application Priority Data

Sep. 20, 2018 (CN) .......................... 201811101734.3

(51) Int. Cl.
*G06F 1/16* (2006.01)
*H04M 1/02* (2006.01)
(Continued)

(52) U.S. Cl.
CPC ........ *H04M 1/0214* (2013.01); *G06F 1/1616* (2013.01); *G06F 1/266* (2013.01); *H04M 1/0266* (2013.01); *H04M 1/72454* (2021.01)

(58) Field of Classification Search
CPC combination set(s) only.
See application file for complete search history.

(56) References Cited

U.S. PATENT DOCUMENTS 7,057,360 B1    6/2006 Hsu
9,007,306 B2 *  4/2015 Liu ........................ G06F 1/1677
                                                345/168
(Continued)

FOREIGN PATENT DOCUMENTS

CN    101281019 A    10/2008
CN    101487691 A     7/2009
(Continued)

OTHER PUBLICATIONS

CN Office Action dated Oct. 28, 2019 as received in Application No. 201811101734.3.
(Continued)

*Primary Examiner* — Lisa Lea-Edmonds
(74) *Attorney, Agent, or Firm* — Maschoff Brennan

(57) ABSTRACT

An angle determining circuit and method, and a folding screen terminal are provided. The circuit is applied to the folding screen terminal which includes a first and second screens rotatably connected through a rotary shaft, a resistance ring is fixedly provided outside the rotary shaft. The circuit includes: a first power supply; a first resistor, where one terminal of the first resistor is electrically connected to the first power supply; a first conductive element fixedly disposed at the first screen, where one terminal of the first conductive element is electrically connected to the other terminal of the first resistor, and the other terminal thereof slidably abuts against the resistance ring; a second conductive element fixedly disposed at the second screen, where one terminal of the second conductive element slidably abuts against the resistance ring, and the other terminal thereof is grounded; and a processor.

20 Claims, 6 Drawing Sheets

(51) Int. Cl.
    *H04M 1/72454*    (2021.01)
    *G06F 1/26*       (2006.01)

(56) References Cited

U.S. PATENT DOCUMENTS

| | | | |
|---|---|---|---|
| 11,287,845 B2* | 3/2022 | Itou | G06F 1/1618 |
| 2003/0020701 A1 | 1/2003 | Nakamura et al. | |
| 2006/0155391 A1 | 7/2006 | Pistemaa et al. | |
| 2009/0188120 A1* | 7/2009 | Steinich | G01D 3/08 |
| | | | 324/123 R |
| 2016/0188079 A1* | 6/2016 | Xu | G06F 1/1652 |
| | | | 345/173 |

FOREIGN PATENT DOCUMENTS

| | | |
|---|---|---|
| CN | 201860352 U | 6/2011 |
| CN | 102147639 A | 8/2011 |
| CN | 104315970 A | 1/2015 |
| CN | 107454212 A | 12/2017 |
| CN | 107623758 A | 1/2018 |
| CN | 108459797 A | 8/2018 |
| CN | 109040377 A | 12/2018 |

OTHER PUBLICATIONS

Written Opinion of the International Searching Authority dated Apr. 1, 2021 as received in Application No. PCT/CN2019/099924.
European Search Report dated Oct. 25, 2021 as received in application No. 19863091.5.
EP Office Action dated Feb. 10, 2023 as received in Application No. 19863091.5.

* cited by examiner

ANGLE DETERMINING CIRCUIT, ANGLE DETERMINING METHOD, AND FOLDING SCREEN TERMINAL

CROSS-REFERENCE TO RELATED APPLICATIONS

This application is a continuation application of PCT Application No. PCT/CN2019/099924 filed on Aug. 9, 2019, which claims priority to Chinese Patent Application No. 201811101734.3, filed in China on Sep. 20, 2018, the disclosures of which are incorporated herein by reference in their entireties.

TECHNICAL FIELD

Embodiments of this disclosure relate to the technical field of folding screens, and in particular, to an angle determining circuit, an angle determining method, and a folding screen terminal.

BACKGROUND

With rapid development of communications technologies, folding screen terminals have become increasingly popular. Generally, a folding screen terminal includes two screens that are rotatably connected, and a user can adjust an included angle between the two screens based on actual use needs (the included angle may also be referred to as a folding angle, and the folding angle may range from 0 degrees to 180 degrees).

In many cases, the user often wants to determine the folding angle of the folding screen terminal. Currently, a commonly used determining method is to add a gravity sensor to each of the two screens, and calculate the folding angle based on component data of the gravity sensors. However, the gravity sensor has a relatively complex mechanical structure which is subject to thermal stress. Therefore, the component data of the gravity sensor is very likely to be affected by a temperature factor. As a result, the determining method has relatively low accuracy.

SUMMARY

According to a first aspect, an embodiment of this disclosure provides an angle determining circuit, applied to a folding screen terminal, where the folding screen terminal includes a first screen and a second screen that are rotatably connected through a rotary shaft, a resistance ring is fixedly provided outside the rotary shaft, and the circuit includes:

a first power supply;

a first resistor, where one terminal of the first resistor is electrically connected to an output terminal of the first power supply;

a first conductive element, where the first conductive element is fixedly disposed at the first screen, one terminal of the first conductive element is electrically connected to the other terminal of the first resistor, and the other terminal of the first conductive element slidably abuts against the resistance ring;

a second conductive element, where the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring; and a processor;

wherein the processor is configured to obtain a divided voltage value between the other terminal of the first resistor and the other terminal of the second conductive element, and determine an included angle between the first screen and the second screen based on a voltage value of the first power supply, a resistance value of the first resistor, and the obtained divided voltage value.

According to a second aspect, an embodiment of this disclosure provides a folding screen terminal, including the foregoing angle determining circuit.

According to a third aspect, an embodiment of this disclosure provides an angle determining method, applied to the foregoing angle determining circuit, where the method includes:

obtaining a divided voltage value between the other terminal of a first resistor in the circuit and the other terminal of a second conductive element in the circuit; and determining, based on a voltage value of a first power supply in the circuit, a resistance value of the first resistor, and the obtained divided voltage value, an included angle between a first screen and a second screen that are of a folding screen terminal provided with the circuit.

According to a fourth aspect, an embodiment of this disclosure provides a non-transitory computer readable storage medium storing therein a computer program, wherein the computer program is configured to be executed by a processor, to implement the steps of the angle determining method described above.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

Figure 1:
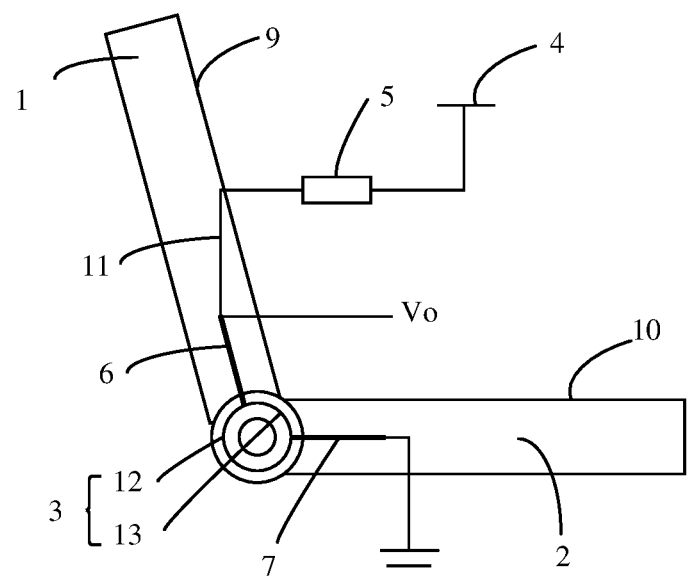
FIG. 1 is a schematic structural diagram 1 of an angle determining circuit according to an embodiment of this disclosure.

Referring to FIG. 1, FIG. 1 is a schematic structural diagram of an angle determining circuit according to an embodiment of this disclosure. The angle determining circuit is applied to a folding screen terminal. The folding screen terminal includes a first screen 1 and a second screen 2 that are rotatably connected through a rotary shaft, and a resistance ring 3 is fixedly provided outside the rotary shaft.

Figure 2:
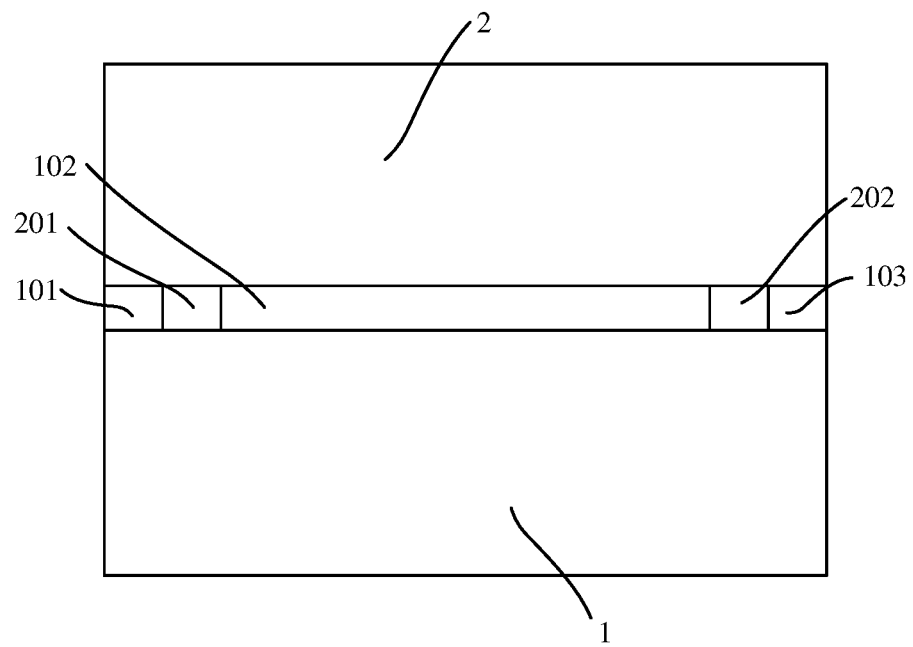
FIG. 2 is a schematic structural diagram of a folding screen terminal according to an embodiment of this disclosure.

Because the first screen 1 and the second screen 2 are rotatably connected through the rotary shaft, relative positions of the first screen 1 and the second screen 2 may be in a state shown in FIG. 1 or FIG. 2. In FIG. 2, a connection section 101, a connection section 102, and a connection section 103 are fixedly disposed at the first screen 1, and a connection section 201 and a connection section 202 are fixedly disposed at the second screen 2.

As shown in FIG. 1, the angle determining circuit according to this embodiment of this disclosure includes a first power supply 4, a first resistor 5, a first conductive element 6, a second conductive element 7, and a processor.

One terminal of the first resistor 5 is electrically connected to an output terminal of the first power supply 4. Specifically, the first power supply 4 may be a regulated power supply.

The first conductive element 6 is fixedly disposed at the first screen 1, one terminal of the first conductive element 6 is electrically connected to the other terminal of the first resistor 5, and the other terminal of the first conductive element 6 slidably abuts against the resistance ring 3.

Specifically, the first conductive element 6 may be made of a metal material, and the first conductive element 6 may be parallel to a display surface 9 of the first screen 1. In addition, the other terminal of the first conductive element 6 may be provided with a first contact spring, the first contact spring may slidably abut against the resistance ring 3, and a contact manner between the first contact spring and the resistance ring 3 may be point contact.

The second conductive element 7 is fixedly disposed at the second screen 2, one terminal of the second conductive element 7 slidably abuts against the resistance ring 3, and the other terminal of the second conductive element 7 is grounded. Sliding paths of the first conductive element 6 and the second conductive element 7 on the resistance ring 3 are located in a same annular region in a circumferential direction of the resistance ring 3.

Specifically, the second conductive element 7 may be made of a metal material, and the second conductive element 7 and the first conductive element 6 may be made of the same or different metal materials. The second conductive element 7 may be parallel to a display surface 10 of the second screen 2. In addition, the one terminal of the second conductive element 7 may be provided with a second contact spring, the second contact spring may slidably abut against the resistance ring 3, and a contact manner between the second contact spring and the resistance ring 3 may be also point contact.

In this embodiment of this disclosure, both the first contact spring and the second contact spring slidably abut against the resistance ring 3, and contact positions of the first contact spring and the second contact spring on the resistance ring 3 relatively change during relative rotation of the first screen 1 and the second screen 2.

Because the sliding paths of the first conductive element 6 and the second conductive element 7 on the resistance ring 3 are located in the same annular region in the circumferential direction of the resistance ring 3, a resistance value of a voltage division circuit module that is formed by the first conductive element 6, the resistance ring 3, and the second conductive element 7 varies with relative change of the contact positions of the first contact spring and the second contact spring on the resistance ring 3, and a divided voltage value of the voltage division circuit module in the angle determining circuit also changes accordingly. It can be learned that there is a relationship between the resistance value of the voltage division circuit module and an included angle between the first screen 1 and the second screen 2. In other words, the resistance value of the voltage division circuit module is associated with the folding angle of the folding screen terminal.

The processor is configured to obtain a divided voltage value between the other terminal of the first resistor 5 and the other terminal of the second conductive element 7, and calculate the included angle (also referred to as a folding angle) between the first screen 1 and the second screen 2 based on the voltage value of the first power supply 4, the resistance value of the first resistor 5, and the obtained divided voltage value.

The processor may be a central processing unit (CPU).

It should be noted that the divided voltage value between the other terminal of the first resistor 5 and the other terminal of the second conductive element 7 may be considered as the divided voltage value of the voltage division circuit module in the angle determining circuit, and the processor obtains the divided voltage value in a plurality of specific implementation forms, which are described below by using examples.

In one implementation manner, the angle determining circuit further includes an analog-to-digital converter (ADC). The processor is electrically connected to a common terminal of the first resistor 5 and the first conductive element 6 through the ADC, and the processor is specifically configured to obtain a divided voltage value obtained through sampling by the ADC.

As shown in FIG. 1, the other terminal of the first resistor 5 may be electrically connected to one terminal of the first conductive element 6 through a connection line 11, and the processor may be electrically connected to the connection line 11 through the ADC, so that the processor is electrically connected to the common terminal of the first resistor 5 and the first conductive element 6. In this way, the ADC may obtain Vo through sampling, where Vo is the divided voltage value of the voltage division circuit module.

Figure 3:
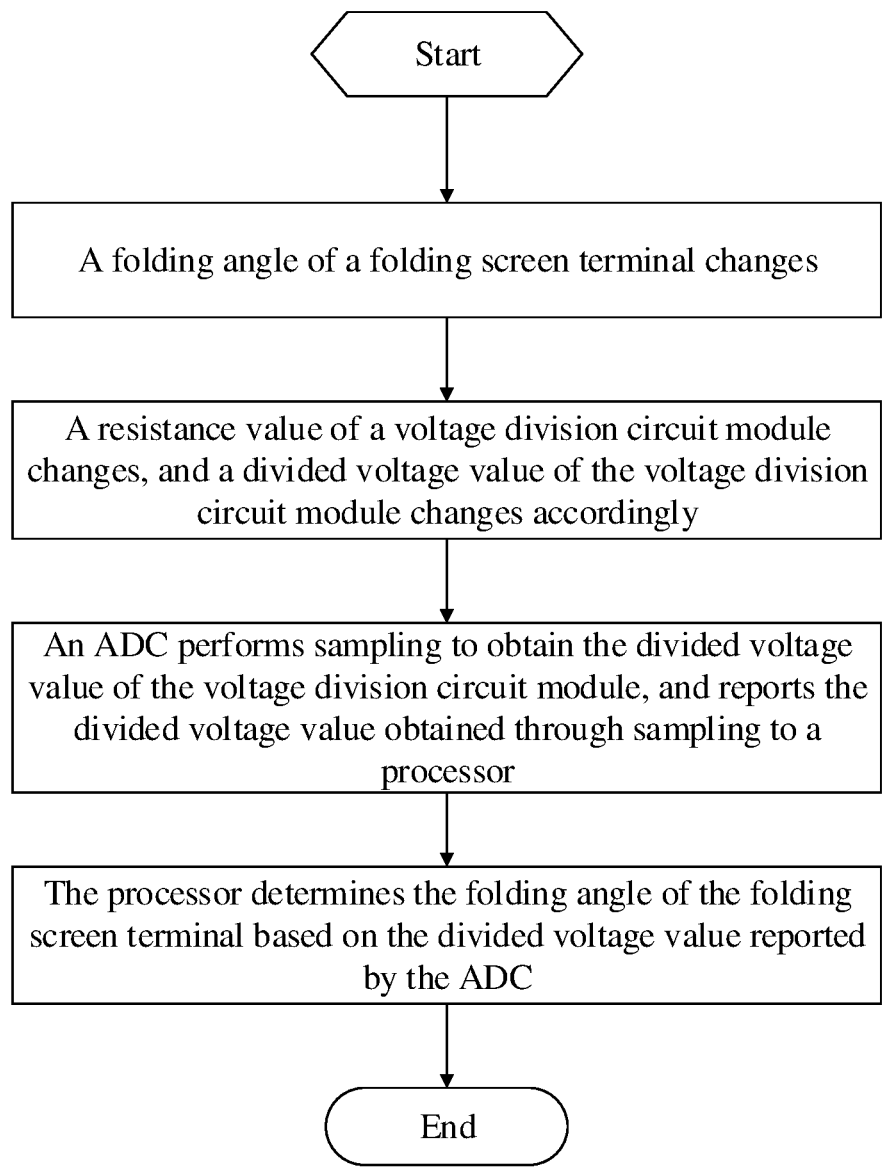
FIG. 3 is a working flowchart of an angle determining circuit according to an embodiment of this disclosure.

When this implementation manner is used, as shown in FIG. 3, the folding angle of the folding screen terminal varies with the relative rotation of the first screen 1 and the second screen 2. In this way, the resistance value of the voltage division circuit module changes, and the divided voltage value of the voltage division circuit module changes accordingly. Next, the ADC may perform sampling to obtain the divided voltage value of the voltage division circuit module, and report the divided voltage value obtained through sampling to the processor. Then, the processor may determine the folding angle of the folding screen terminal based on the divided voltage value reported by the ADC.

It can be learned that, in this implementation manner, the processor can obtain the divided voltage value of the voltage division circuit module through the ADC very conveniently. In addition, the ADC may convert an analog signal to a digital signal, so that a voltage value finally obtained by the processor is a digital signal, and the processor can identify and process the digital signal, so as to determine the folding angle based on the digital signal.

Certainly, a manner of obtaining the divided voltage value of the voltage division circuit module by the processor is not limited thereto, and the divided voltage value may be specifically determined based on an actual situation, which is not limited in this embodiment of this disclosure.

In this embodiment of this disclosure, the angle determining circuit may be provided in the folding screen terminal, and the angle determining circuit may include the first power supply 4, the first resistor 5, the first conductive element 6, the second conductive element 7, and the processor. The resistance ring 3 may be fixedly provided outside the rotary shaft. With proper configuration of a connection relationship between the first conductive element 6 and other components and a connection relationship between the second conductive element 7 and other components, the first conductive element 6, the resistance ring 3, and the second conductive element 7 may form a voltage division circuit module, and the resistance value and the divided voltage value of the voltage division circuit module are associated with the folding angle of the folding screen. Based on a correlation between the resistance value and the divided voltage value of the voltage division circuit module and the folding angle of the folding screen, after obtaining the divided voltage value of the voltage division circuit module, the processor may determine the folding angle of the folding screen terminal based on the voltage value of the first power supply 4, the resistance value of the first resistor 5, and the divided voltage value of the voltage division circuit module.

It can be learned that, in this embodiment of this disclosure, the folding angle of the folding screen terminal is determined by using the angle determining circuit, an overall structure of the angle determining circuit is very simple, and the angle determining circuit does not include a complex mechanical structure. In addition, performance of each component in the angle determining circuit is not likely to be affected by a temperature factor. Therefore, compared with the related art, in this embodiment of this disclosure, during determining of the folding angle, the impact of the temperature factor on the determining result can be effectively avoided, thereby improving accuracy of the determined folding angle.

Optionally, as shown in FIG. 1, abutting positions of the first conductive element 6 and the second conductive element 7 on the resistance ring 3 divide the annular region into a first arc section 12 and a second arc section 13, and the first arc section 12 is farther away from the display surface 9 of the first screen 1 than the second arc section 13. It can be understood that the first arc section 12 is also farther away from the display surface 10 of the second screen 2 than the second arc section 13.

The processor is specifically configured to:

calculate a first parallel resistance value of the first arc section 12 and the second arc section 13 based on the voltage value of the first power supply 4, the resistance value of the first resistor 5, and the obtained divided voltage value; and calculate the included angle between the first screen 1 and the second screen 2 based on a preset resistance value of the annular region and the first parallel resistance value.

Figure 4:
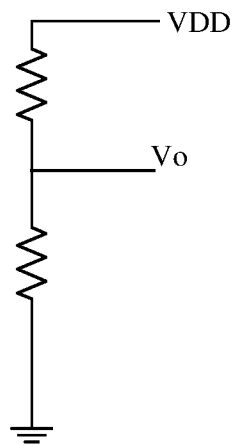
FIG. 4 is an equivalent circuit diagram of an angle determining circuit according to an embodiment of this disclosure.

It should be noted that the angle determining circuit in FIG. 1 may be equivalent to the circuit shown in FIG. 4 regardless of the relative positions of the first screen 1 and the second screen 2. In FIG. 4, a resistor located at a lower position may be considered as a variable resistor, and is equivalent to the voltage division circuit module formed by the first conductive element 6, the resistance ring 3, and the second conductive element 7 in FIG. 1. A resistor located at an upper position may be considered as a fixed resistor, and is equivalent to the first resistor 5 in FIG. 1. VDD is equivalent to the voltage value of the first power supply 4 in FIG. 1, and Vo is the divided voltage value obtained through sampling by the ADC (that is, the divided voltage value of the voltage division circuit module). Assuming that the resistance value of the first resistor 5 is R1 and the resistance value of the voltage division circuit module is R2, R1, R2, VDD, and Vo satisfy the following formula (1).

$$Vo = VDD \times R2/(R1+R2) \tag{1}$$

It should be noted that compared with resistance values of resistance-type components (for example, the resistance ring 3 and the first resistor 5), resistance values of the first conductive element 6 and the second conductive element 7 are very small and can be ignored. As can be easily seen with reference to FIG. 1, the resistance value of the voltage division circuit module may be specifically a parallel resistance value of the first arc section 12 and the second arc section 13. Assuming that a resistance value of the first arc section 12 is r1 and a resistance value of the second arc section 13 is r2, r1, r2, and R2 satisfy the following formula (2).

$$R2 = r1 \times r2/(r1+r2) \tag{2}$$

Assuming that the included angle (namely, the folding angle) between the first screen 1 and the second screen 2 is $\Phi$, it can be seen from FIG. 1 that r1, r2, and $\Phi$ satisfy a specific geometric relationship. For details of the geometric relationship, refer to the following formula (3).

$$\Phi = 360 \times r2/(r1+r2) \tag{3}$$

A sum of r1 and r2 (that is, r1+r2) is a preset resistance value of the annular region. In an ideal scenario, the preset resistance value may be considered as a determined value, and the preset resistance value may be pre-stored in the processor.

In this embodiment, the voltage value VDD of the first power supply 4 and the resistance value R1 of the first resistor 5 may be also pre-stored in the processor. The processor may obtain the divided voltage value Vo of the voltage division circuit module that is obtained through sampling by the ADC, and substitute the pre-stored VDD and R1 and the obtained Vo into the foregoing formula (1) to obtain R2. In this case, R2 is the first parallel resistance value of the first arc section 12 and the second arc section 13.

Next, the processor may substitute the pre-stored preset resistance value (namely, the sum of r1 and r2) and the first parallel resistance value R2 of the first arc section 12 and the second arc section 13 into the formula (2) to obtain a product of r1 and r2. It can be understood that when the sum and the product of r1 and r2 are both known, the processor may calculate r1 and r2 very conveniently.

Then, the processor may substitute the calculated r1 and r2 into the formula (3) to obtain $\Phi$ as the included angle (namely, the folding angle) between the first screen 1 and the second screen 2.

It should be noted that the foregoing formula (3) may be changed to the following formula (4).

$$\Phi = 360 \times 1/(r1/r2+1) \qquad (4)$$

Then, after calculating r1 and r2, the processor may calculate a ratio of r1 to r2 (namely, r1/r2). Next, it is also feasible that the processor may substitute the calculated ratio of r1 to r2 into the foregoing formula (4) to obtain Φ as the folding angle.

It can be learned that, in this embodiment, the processor may calculate the first parallel resistance value of the first arc section 12 and the second arc section 13 very conveniently based on the voltage value of the first power supply 4, the resistance value of the first resistor 5, and the obtained divided voltage value. Then, the processor may calculate the folding angle of the folding screen terminal very conveniently based on the preset resistance value of the annular region and the first parallel resistance value.

Optionally, the angle determining circuit further includes a detection circuit. The detection circuit is electrically connected to the processor, and the detection circuit is configured to perform detection for a target event, where the target event is an event that the included angle between the first screen 1 and the second screen 2 is a preset angle.

The processor is further configured to:

obtain the divided voltage value between the other terminal of the first resistor 5 and the other terminal of the second conductive element 7 when the target event is detected by the detection circuit;

calculate a second parallel resistance value of the first arc section 12 and the second arc section 13 based on the voltage value of the first power supply 4, the resistance value of the first resistor 5, and the obtained divided voltage value;

calculate a real-time resistance value of the annular region based on the preset angle and the second parallel resistance value; and update the preset resistance value of the annular region to the calculated real-time resistance value.

The preset angle may be 45 degrees, 90 degrees, or 180 degrees. Certainly, a value of the preset angle is not limited thereto, and it is merely necessary to ensure that the preset angle is between 0 degrees and 180 degrees. The specific value of the preset angle is not limited in this embodiment.

Because the first conductive element 6 and the second conductive element 7 each slidably abut against the resistance ring 3, mechanical wear occurs in the resistance ring 3 during operation, and a mechanical wear degree of the resistance ring 3 increases as the operation time increases. As a result, an actual resistance value (namely, an actual sum of r1 and r2) and a contact impedance of the annular region both change, and accuracy of the calculation result is affected when the processor calculates the folding angle by using the formula (1) to the formula (3).

In view of this, in this embodiment, the processor may calibrate the sum of r1 and r2 (namely, the preset resistance value) included in both the formula (2) and the formula (3). In order to calibrate the preset resistance value, the detection circuit for detecting the target event may be provided in the angle determining circuit. The target event is an event that the folding angle is the preset angle.

With the detection circuit disposed, the processor may detect the target event by using the detection circuit. In a case in which the target event is detected by the detection circuit, a current Φ (namely, the folding angle) may be considered as the preset angle. In this case, the processor may obtain Vo (namely, the divided voltage value of the voltage division circuit module) currently obtained through sampling by the ADC, and substitute the pre-stored VDD and R1, and Vo currently obtained through sampling by the ADC into the foregoing formula (1) to obtain R2. In this way, the obtained R2 is used as the second parallel resistance value of the first arc section 12 and the second arc section 13.

Next, the processor may substitute the second parallel resistance value R2 of the first arc section 12 and the second arc section 13 into the foregoing formula (2), substitute the preset angle as the value of Φ into the foregoing formula (3), and solve the formulas (2) and (3) simultaneously to obtain r1 and r2. Then, the processor may use the resulting sum of r1 and r2 as the calculated real-time resistance value of the annular region. Finally, the processor may update the preset resistance value of the annular region to the calculated real-time resistance value, thereby implementing calibration of the preset resistance value.

It can be learned that, in this embodiment, the processor can implement calibration of the preset resistance value very conveniently, so that the processor can subsequently determine the folding angle based on the calibrated preset resistance value, to effectively ensure accuracy of the determining result.

Figure 5:
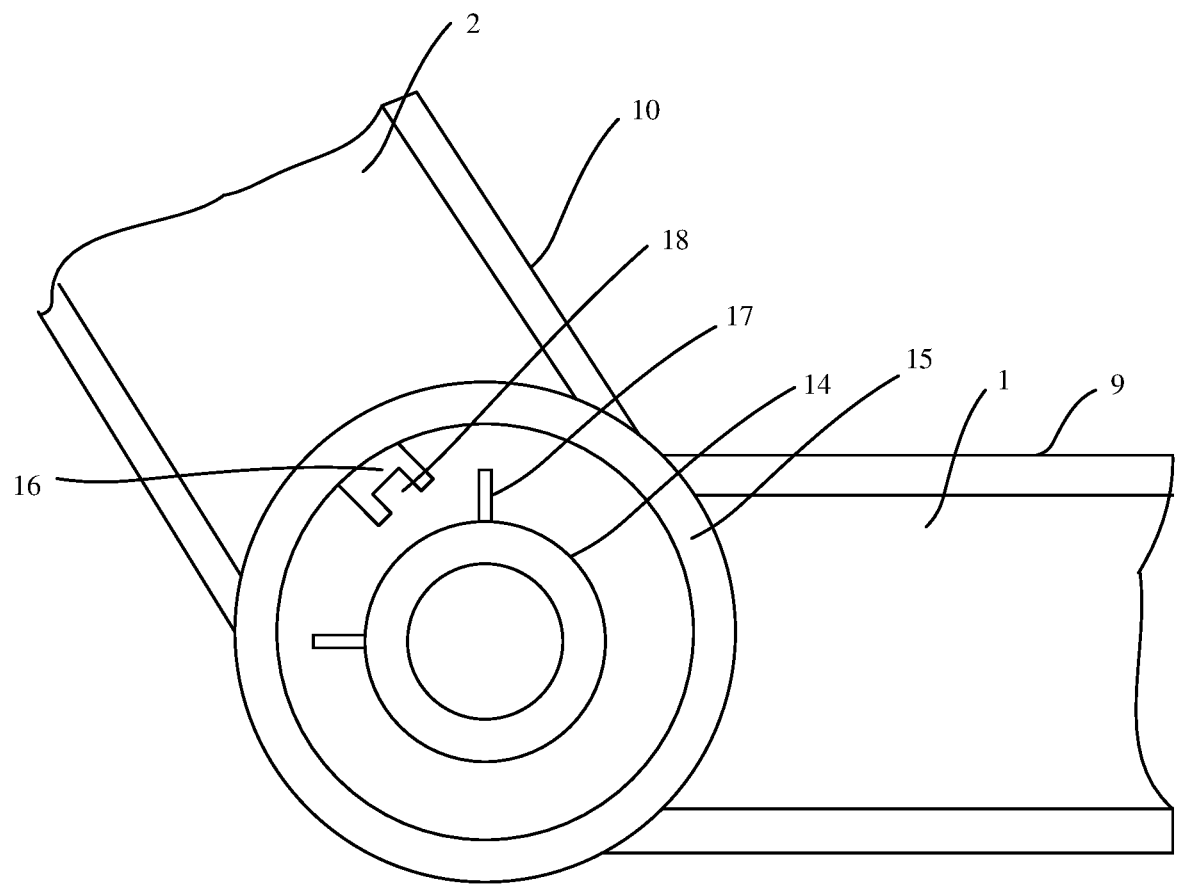
FIG. 5 is a schematic structural diagram 2 of an angle determining circuit according to an embodiment of this disclosure.

Optionally, as shown in FIG. 5, the first screen 1 is fixedly provided with a first connection portion 14, the second screen 2 is fixedly provided with a second connection portion 15, and the second connection portion 15 and the first connection portion 14 are fitted with one sleeving the other. It should be noted that during relative rotation of the first screen 1 and the second screen 2, the second connection portion 15 and the first connection portion 14 may relatively rotate.

The detection circuit includes a groove-shaped optocoupler 16 and a metal baffle 17.

The groove-shaped optocoupler 16 is fixedly disposed on a wall surface of the second connection portion 15, and an included angle between the groove-shaped optocoupler 16 and the display surface 10 of the second screen 2 is 0 degrees.

The metal baffle 17 is fixedly disposed on a wall surface of the first connection portion 14, and an included angle between the metal baffle 17 and the display surface 9 of the first screen 1 is the preset angle. The preset angle is greater than 0 degrees and less than or equal to 180 degrees. The metal baffle 17 is able to enter or exit a groove 18 of the groove-shaped optocoupler 16 during relative rotation of the first screen 1 and the second screen 2.

The processor is electrically connected to a collector of the groove-shaped optocoupler 16, and the processor is specifically configured to:

when it is detected that a preset change occurs in an output state of the collector, determine that the target event is detected.

Specifically, the second connection portion 15 may be disposed outside the first connection portion 14. In this case, the groove-shaped optocoupler 16 may be welded to an inner wall of the second connection portion 15, and the metal baffle 17 may be welded to an outer wall of the first connection portion 14. Certainly, the second connection portion 15 may alternatively be disposed inside the first connection portion 14. In this case, the groove-shaped optocoupler 16 may be welded to an outer wall of the second connection portion 15, and the metal baffle 17 may be welded to an inner wall of the first connection portion 14. For ease of description, in this embodiment, that the second connection portion 15 is disposed outside the first connection portion 14 is used as an example.

Figure 6:
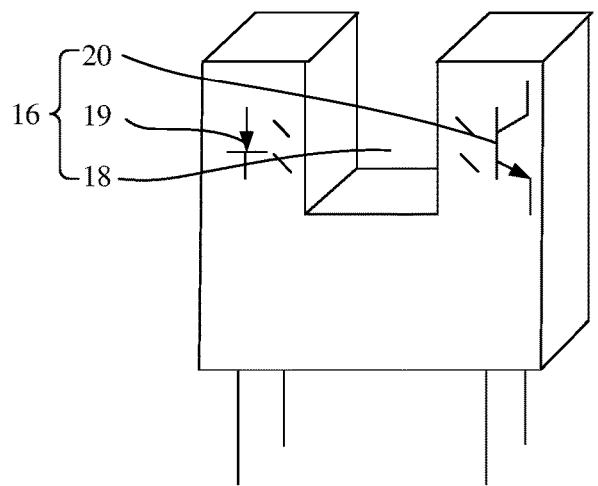
FIG. 6 is a schematic structural diagram of a groove-shaped optocoupler.

Generally, the groove-shaped optocoupler 16 is a structure shown in FIG. 6, and the groove-shaped optocoupler 16 includes an infrared light emitting tube 19 and a phototransistor 20; The groove 18 of the groove-shaped optocoupler 16 is provided between the infrared light emitting tube 19 and the phototransistor 20, and a collector of the groove-shaped optocoupler 16 is specifically a collector of the infrared light emitting tube 19.

It can be understood that, when there is no metal shielding between the infrared light emitting tube 19 and the phototransistor 20, the phototransistor 20 is in an on state; and when there is metal shielding between the infrared light emitting tube 19 and the phototransistor 20, the phototransistor 20 is in an off state. Because the groove-shaped optocoupler 16 has the foregoing characteristics, the groove-shaped optocoupler 16 can be used for mechanical rotation positioning.

In this embodiment, based on different preset angles, the processor detects the target event by using the detection circuit in different manners.

In one implementation form, the preset angle is less than 180 degrees; and the processor is specifically configured to:

when it is detected that an output state of the collector is changed back to a first state after being changed from the first state to a second state, determine that the target event is detected.

In another implementation form, the preset angle is equal to 180 degrees; and the processor is specifically configured to:

when it is detected that an output state of the collector is changed from a first state to a second state, determine that the target event is detected.

In the foregoing two implementation forms, the output state of the collector being the first state is used to indicate that the phototransistor 20 is in the on state, and the output state of the collector being the second state is used to indicate that the phototransistor 20 is in the off state. The first state may be denoted by 1 and the second state may be denoted by 0.

Assuming that the preset angle is less than 180 degrees (for example, the preset angle is 90 degrees), as can be easily seen from FIG. 5, when the folding angle is 90 degrees, one end of the metal baffle 17 is just located inside the groove 18. In this case, the phototransistor 20 is in the off state, and the output state of the collector of the phototransistor 20 is the second state. When the folding angle is not 90 degrees, one end of the metal baffle 17 is located outside the groove 18. In this case, the phototransistor 20 is in the on state, and the output state of the collector of the phototransistor 20 is the first state.

In this way, during relative rotation of the first connection portion 14 and the second connection portion 15 to make the folding angle go across 90 degrees, the output state of the collector is changed from the first state to the second state and then changed back to the first state. In view of this, when it is detected that the output state of the collector is changed back to the first state after being changed from the first state to the second state, the processor may determine that the target event is detected.

Assuming that the preset angle is equal to 180 degrees, it is easy to be seen from FIG. 5 that when the folding angle is 180 degrees, one end of the metal baffle 17 is just located in the groove 18. In this case, the phototransistor 20 is in the off state, and the output state of the collector of the phototransistor 20 is the second state. When the folding angle is not 180 degrees, one end of the metal baffle 17 is located outside the groove 18. In this case, the phototransistor 20 is in the on state, and the output state of the collector of the phototransistor 20 is the first state. Because a maximum folding angle is 180 degrees, when the folding angle is changed from non-180 degrees to 180 degrees, the output state of the collector is changed only from the first state to the second state.

In this way, during relative rotation of the first connection portion 14 and the second connection portion 15 to make the folding angle become 180 degrees, the output state of the collector is changed from the first state to the second state. In view of this, when it is detected that the output state of the collector is changed from the first state to the second state, the processor may determine that the target event is detected.

It can be learned that in this embodiment, the detection circuit has a very simple structure, and the processor can reliably detect the target event by monitoring the change of the output state of the collector.

Optionally, the preset angle is less than 180 degrees; and the processor is specifically configured to:

when it is determined that the target event is detected, obtain the divided voltage value between the other terminal of the first resistor 5 and the other terminal of the second conductive element 7 before the output state is changed from the first state to the second state and that after the output state is changed back to the first state; and calculate the second parallel resistance value of the first arc section 12 and the second arc section 13 based on the voltage value of the first power supply 4, the resistance value of the first resistor 5, and an average value of the two divided voltage values.

The following describes a specific implementation process of this embodiment by using a specific example.

Assuming that the preset angle is 90 degrees, the output state of the collector is changed from 0 to 1 and then from 1 to 0 in a process in which the folding angle goes across 90 degrees. The processor may obtain two divided voltage values, $V_{90}{}^1$ and $V_{90}{}^2$, of the voltage division circuit module respectively before the output state is changed from 0 to 1 and after the output state of the collector is changed backed to 0. Next, the processor may calculate an average value of $V_{90}{}^1$ and $V_{90}{}^2$, that is, $(V_9O^1+V_9O^2)/2$. Then, during calculation of the second parallel resistance value, the processor may substitute $(V_{90}{}^1+V_{90}{}^2)/2$ as an actual value of Vo into the foregoing formula (1) for calculation, so as to prevent the calculation result from being affected by structural dimensions of the groove-shaped optocoupler 16 and the metal baffle 17.

It can be learned that in this embodiment, when the preset angle is less than 180 degrees, the processor may calculate the second parallel resistance value based on the voltage value of the first power supply 4, the resistance value of the first resistor 5, and the average value of the two divided voltage values, thereby preventing the calculation result from being affected by structural dimensions of the groove-shaped optocoupler 16 and the metal baffle 17. In this way, the calibration effect is effectively ensured when the processor calibrates the preset resistance value.

Optionally, as shown in FIG. 5, the outer wall of the first connection portion 14 may be provided with two metal baffles 17. A preset angle corresponding to one metal baffle 17 may be 90 degrees, and a preset angle corresponding to the other metal baffle 17 may be 180 degrees. After obtaining $V_{90}{}^1$ and $V_{90}{}^2$, the processor may further calibrate the preset resistance value based on $V_{90}{}^1$, $V_{90}{}^2$, and the preset angle of 180 degrees.

Specifically, for the preset angle of 180 degrees, when the processor detects that the output state of the collector is changed from 0 to 1, the processor may obtain a divided voltage value $V_{180}^0$ of the voltage division circuit module that is obtained after the output state is changed to 1. Then, based on characteristics of a linear resistor, the processor may obtain $V_{180}$ by using the following formula (5).

$$V_{180} = V_{180}^0 + (V_{90}^1 - V_{90}^2)/2 \quad (5)$$

Then, during calculation of the second parallel resistance value, the processor may substitute $V_{180}^0$ as the actual value of Vo into the foregoing formula (1) for calculation, and calibrate the preset resistance value based on the calculation result.

It can be learned that in this embodiment, two metal baffles 17 are provided on the outer wall of the first connection portion 14 to divide 0 degrees to 180 degrees into two intervals of 0 degrees to 90 degrees and 90 degrees to 180 degrees, and the processor can calibrate the preset resistance value at positions of 90 degrees and 180 degrees separately based on linearity of the resistor. In order to further improve the calibration effect, two or more metal baffles 17 may be provided on the outer wall of the first connection portion 14 (for example, one more metal baffle 17 may be disposed at a position of 170 degrees on the basis of FIG. 5), so as to divide 0 degrees to 180 degrees into two or more intervals.

Figure 7:
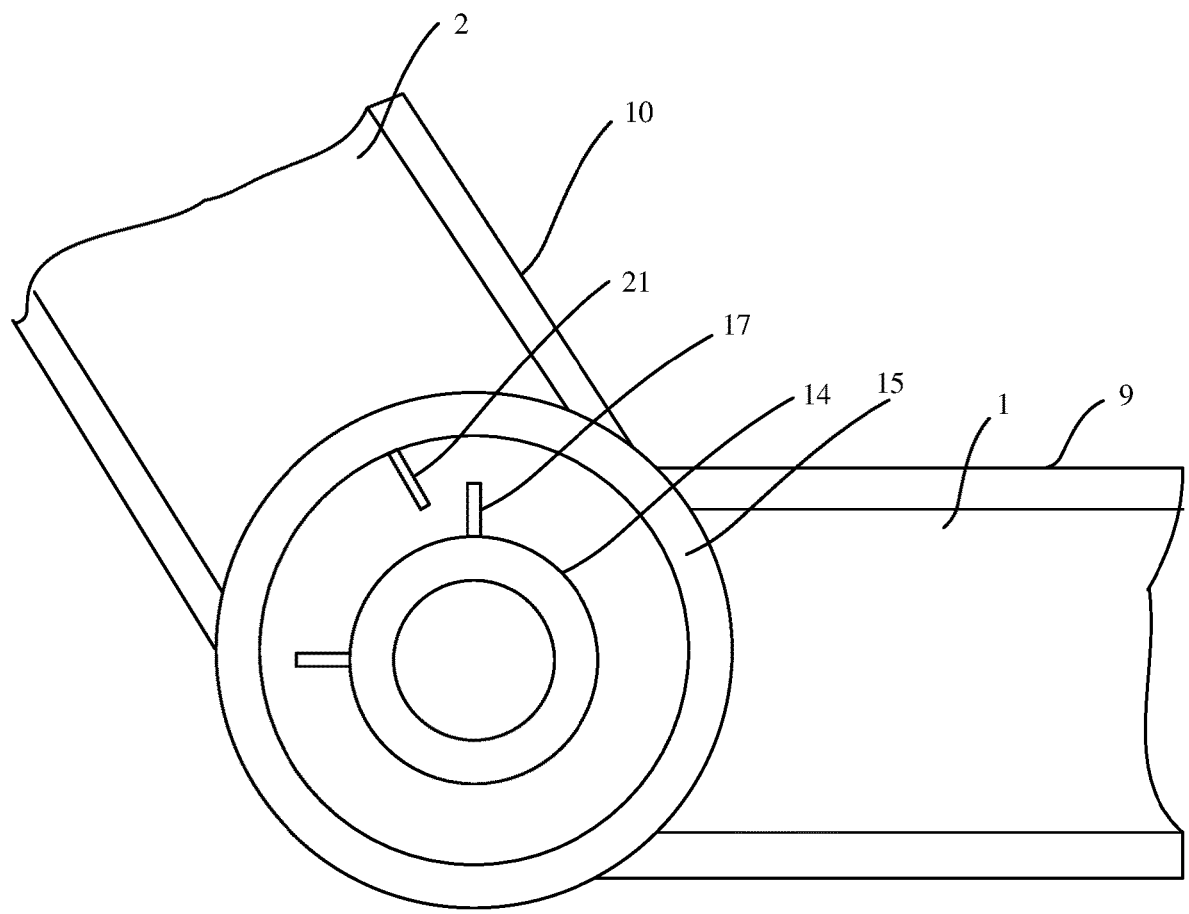
FIG. 7 is a schematic structural diagram 3 of an angle determining circuit according to an embodiment of this disclosure.

Optionally, as shown in FIG. 7, the first screen 1 is fixedly provided with a first connection portion 14, the second screen 2 is fixedly provided with a second connection portion 15, and the second connection portion 15 and the first connection portion 14 are fitted with one sleeving the other. It should be noted that during relative rotation of the first screen 1 and the second screen 2, the second connection portion 15 and the first connection portion 14 may relatively rotate.

The detection circuit includes a second power supply (not shown in the figure), a second resistor (not shown in the figure), a metal spring 21 (for example, a metal soft spring), and a metal baffle 17.

One terminal of the second resistor is electrically connected to an output terminal of the second power supply. Specifically, a voltage value of the second power supply may be 1.8V.

The metal spring 21 is fixedly disposed on the wall surface of the second connection portion 15, and an included angle between the metal spring 21 and the display surface 10 of the second screen 2 is 0 degrees. The metal spring 21 is electrically connected to the other terminal of the second resistor.

The metal baffle 17 is fixedly disposed on the wall surface of the first connection portion 14, and an included angle between the metal baffle 17 and the display surface 9 of the first screen 1 is the preset angle. The metal baffle 17 is grounded. The preset angle is greater than 0 degrees and less than or equal to 180 degrees. The metal spring 21 may come in contact with the metal baffle 17 during relative rotation of the first screen 1 and the second screen 2. Optionally, the metal baffle 17 may be grounded.

The processor is further electrically connected to the metal spring 21, and the processor is specifically configured to:

when it is detected that a signal state of the metal spring 21 is changed from a third state to a fourth state, determine that the target event is detected.

Specifically, the second connection portion 15 may be disposed outside the first connection portion 14. In this case, the metal spring 21 may be welded to an inner wall of the second connection portion 15, and the metal baffle 17 may be welded to an outer wall of the first connection portion 14. Certainly, the second connection portion 15 may alternatively be disposed inside the first connection portion 14. In this case, the metal spring 21 may be welded to an outer wall of the second connection portion 15, and the metal baffle 17 may be welded to an inner wall of the first connection portion 14. For ease of description, in this embodiment, that the second connection portion 15 is disposed outside the first connection portion 14 is used as an example.

In this embodiment, the signal state of the metal spring 21 being the third state is used to indicate that no current flows through the metal spring 21, and the signal state of the metal spring 21 being the fourth state is used to indicate that current flows through the metal spring 21. The third state may be denoted by 1, and the fourth state may be denoted by 0.

Specifically, there may be one, two, three, or more than three metal baffles 17, which are not enumerated one by one herein.

As can be easily seen from FIG. 7, when the folding angle is the preset angle, the metal spring 21 just comes in contact with the metal baffle 17, and the current flows through the metal spring 21, so that the signal state of the metal spring 21 is the third state. When the folding angle is not the preset angle, the metal spring 21 does not come in contact with the metal baffle 17, and no current flows through the metal spring 21, so that the signal state of the metal spring 21 is the fourth state.

In this way, during relative rotation of the first connection portion 14 and the second connection portion 15 to make the folding angle become the preset angle, the signal state of the metal spring 21 is changed from the third state to the fourth state. In view of this, when it is detected that the signal state of the metal spring 21 is changed from the third state to the fourth state, the processor may determine that the target event is detected.

It can be learned that in this embodiment, the detection circuit has a very simple structure, and the processor can reliably detect the target event by monitoring the change in the signal state of the metal spring 21.

Optionally, the processor is specifically configured to:

calculate the second parallel resistance value of the first arc section 12 and the second arc section 13 based on the voltage value of the first power supply 4, the resistance value of the first resistor 5, and the obtained divided voltage value when the obtained divided voltage value falls within a preset voltage range corresponding to the preset angle.

Assuming that the preset angle is 90 degrees, if the metal spring 21 is a metal soft spring, the metal spring 21 vibrates in a process from being in contact with the metal baffle 17 (that is, the folding angle is 90 degrees) to not being in contact with the metal baffle 17. Due to vibration of the metal spring 21, even if the folding angle is not 90 degrees (for example, the folding angle is 91 degrees, 92 degrees, or the like), the processor may still detect that the signal state of the metal spring 21 is changed from the third state to the fourth state. In this case, the processor calibrates the preset resistance value based on the folding angle of 90 degrees, and consequently the calibrated preset resistance value does not match the actual situation.

In order to resolve the foregoing problem, in this embodiment, the processor may use a dither elimination algorithm. Specifically, a correspondence between the preset angle and the preset voltage range may be stored in the processor. A preset voltage range corresponding to any preset angle includes a proper value, to be used when the folding angle is the preset angle, of the divided voltage value of the voltage division circuit module.

For example, a preset voltage range corresponding to 90 degrees may be $(V_{90}^3, V_{90}^4)$; where $V_{90}^3$ is less than $V_{90}^4$, $V_{90}^3$ may be considered as a divided voltage value corresponding to a folding angle (for example, the folding angle of 90−Δ), $V_{90}^4$ may be considered as a divided voltage value corresponding to another folding angle (for example, the folding angle of 90+Δ), and Δ has a very small value. In this way, after the target event is detected by monitoring the change in the signal state of the metal spring 21, the processor may obtain the divided voltage value obtained through sampling by the ADC. Next, the processor may determine whether the obtained divided voltage value is between $V_{90}^3$ and $V_{90}^4$.

If the determining result is yes, the processor may calculate the second parallel resistance value to calibrate the preset resistance value.

If the determining result is no, it indicates that the folding angle is not actually the preset angle, the target event detected by the processor may be caused by vibration of the metal spring 21, and therefore the processor neither calculates the second parallel resistance value nor calibrates the preset resistance value.

It can be learned that in this embodiment, in a case in which the processor can accurately determine that the folding angle is the preset angle, the processor calibrates the preset resistance value only when the folding angle is the preset angle. This can effectively reduce resource consumption for the processor and ensure the calibration effect during calibration of the preset resistance value.

Optionally, the calibration manner by using the groove-shaped optocoupler 16 and the calibration manner by using the metal baffle 17 can be combined to improve the calibration accuracy of the preset resistance value. Specifically, the outer wall of the second connection portion 15 may be provided with both the groove-shaped optocoupler 16 and the metal baffle 17. The groove-shaped optocoupler 16 may be used to detect a case in which the folding angle is not 180 degrees (for example, 90 degrees or 170 degrees), and the metal baffle 17 may be used to detect a case in which the folding angle is 180 degrees.

It should be noted that the folding screen terminal included in the foregoing embodiments is in a plurality of types. Specifically, the folding screen terminal may be a computer, a mobile phone, a tablet computer (Tablet Personal Computer), a laptop computer, a personal digital assistant (PDA), a mobile Internet device (MID), a wearable device, or the like.

In summary, compared with the related art, in this embodiment, during determining of the folding angle, the impact of the temperature factor on the determining result can be effectively avoided, thereby improving accuracy of the determined folding angle.

An embodiment of this disclosure further provides a folding screen terminal. The folding screen terminal includes the foregoing angle determining circuit. The specific implementation process of the angle determining circuit is referred to the description above, and is not limited in this embodiment of this disclosure.

Because the angle determining circuit has the foregoing technical effects, the folding screen terminal having the angle determining circuit also has the corresponding technical effects, and details are not described herein again.

Figure 8:
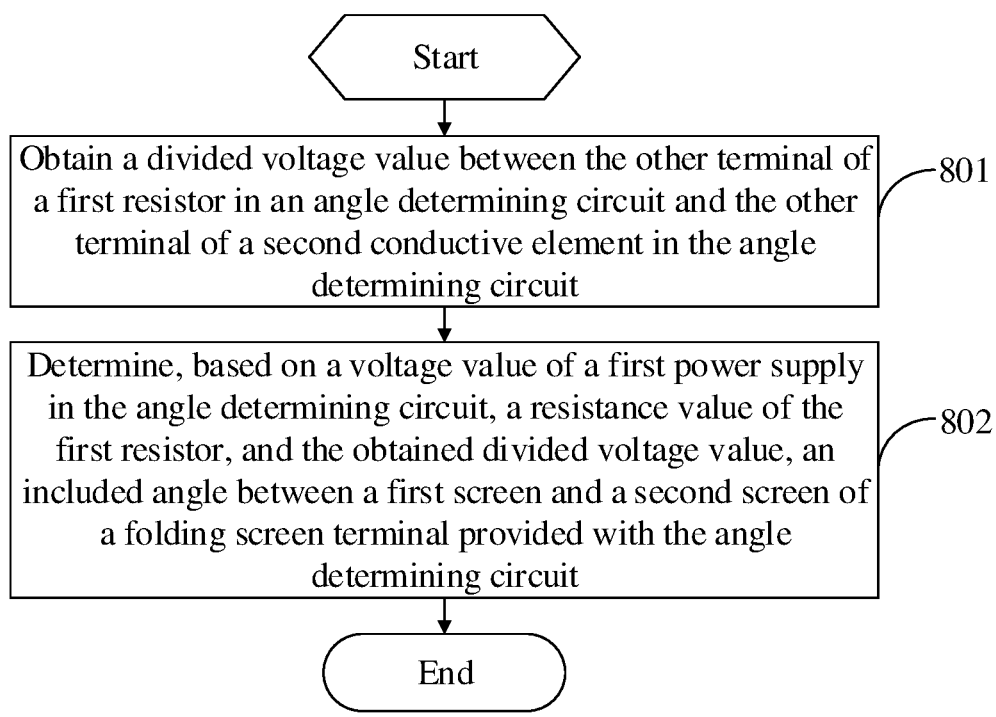
FIG. 8 is a flowchart of an angle determining method according to an embodiment of this disclosure.

Referring to FIG. 8, FIG. 8 is a flowchart of an angle determining method according to an embodiment of this disclosure. The method is applied to an angle determining circuit in a folding screen terminal. The folding screen terminal includes a first screen and a second screen that are rotatably connected through a rotary shaft, a resistance ring is fixedly provided outside the rotary shaft, and the angle determining circuit includes:

a first power supply;

a first resistor, where one terminal of the first resistor is electrically connected to an output terminal of the first power supply;

a first conductive element, where the first conductive element is fixedly disposed at the first screen, one terminal of the first conductive element is electrically connected to the other terminal of the first resistor, and the other terminal of the first conductive element slidably abuts against the resistance ring; and a second conductive element, where the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring.

As shown in FIG. 8, the method includes the following steps.

Step 801: Obtain a divided voltage value between the other terminal of the first resistor in the angle determining circuit and the other terminal of the second conductive element in the angle determining circuit.

Step 802: Determine, based on a voltage value of the first power supply in the angle determining circuit, a resistance value of the first resistor, and the obtained divided voltage value, an included angle between the first screen and the second screen of the folding screen terminal having the angle determining circuit.

Optionally, abutting positions of the first conductive element and the second conductive element on the resistance ring divide the annular region into a first arc section and a second arc section, and the first arc section is farther away from a display surface of the first screen than the second arc section.

The determining, based on a voltage value of the first power supply in the angle determining circuit, a resistance value of the first resistor, and the obtained divided voltage value, an included angle between the first screen and the second screen of the folding screen terminal having the angle determining circuit includes:

calculating a first parallel resistance value of the first arc section and the second arc section based on the voltage value of the first power supply in the angle determining circuit, the resistance value of the first resistor, and the obtained divided voltage value; and calculating, based on a preset resistance value of the annular region and the first parallel resistance value, the included angle between the first screen and the second screen of the folding screen terminal having the angle determining circuit.

Optionally, the angle determining circuit further includes:

a detection circuit, where the detection circuit is configured to perform detection for a target event, and the target event is an event that the included angle between the first screen and the second screen is a preset angle.

The method further includes:

obtaining the divided voltage value between the other terminal of the first resistor and the other terminal of the second conductive element when the target event is detected by the detection circuit in the angle determining circuit;

calculating a second parallel resistance value of the first arc section and the second arc section based on the voltage value of the first power supply, the resistance value of the first resistor, and the obtained divided voltage value;

calculating a real-time resistance value of the annular region based on the preset angle and the second parallel resistance value; and updating the preset resistance value of the annular region to the calculated real-time resistance value.

Optionally, the first screen is fixedly provided with a first connection portion, the second screen is fixedly provided with a second connection portion, and the second connection portion and the first connection portion are fitted with one sleeving the other.

The detection circuit includes:

a groove-shaped optocoupler, where the groove-shaped optocoupler is fixedly disposed on a wall surface of the second connection portion, and an included angle between the groove-shaped optocoupler and a display surface of the second screen is 0 degrees; and a metal baffle, where the metal baffle is fixedly disposed on a wall surface of the first connection portion, and an included angle between the metal baffle and the display surface of the first screen is the preset angle. The preset angle is greater than 0 degrees and less than or equal to 180 degrees. The metal baffle is able to enter or exit a groove of the groove-shaped optocoupler during relative rotation of the first screen and the second screen.

The obtaining the divided voltage value between the other terminal of the first resistor and the other terminal of the second conductive element when the target event is detected by the detection circuit in the angle determining circuit includes:

when it is detected that a preset change occurs in an output state of a collector of the groove-shaped optocoupler, determining that the target event is detected, and obtaining the divided voltage value between the other terminal of the first resistor and the other terminal of the second conductive element.

Optionally, the preset angle is less than 180 degrees; and the when it is detected that a preset change occurs in an output state of a collector of a groove-shaped optocoupler, determining that the target event is detected includes:

when it is detected that the output state of the collector of the groove-shaped optocoupler is changed back to a first state after being changed from the first state to a second state, determining that the target event is detected;

or the preset angle is equal to 180 degrees; and the when it is detected that a preset change occurs in an output state of a collector of a groove-shaped optocoupler, determining that the target event is detected includes:

when it is detected that the output state of the collector of the groove-shaped optocoupler is changed from a first state to a second state, determining that the target event is detected.

Optionally, the preset angle is less than 180 degrees; and the determining that the target event is detected, and obtaining the divided voltage value between the other terminal of the first resistor and the other terminal of the second conductive element includes:

when it is determined that the target event is detected, obtaining the divided voltage value between the other terminal of the first resistor and the other terminal of the second conductive element before the output state is changed from the first state to the second state and that after the output state is changed back to the first state.

The calculating a second parallel resistance value of the first arc section and the second arc section based on the voltage value of the first power supply, the resistance value of the first resistor, and the obtained divided voltage value includes:

calculating the second parallel resistance value of the first arc section and the second arc section based on the voltage value of the first power supply, the resistance value of the first resistor, and an average value of the two divided voltage values.

Optionally, the first screen is fixedly provided with a first connection portion, the second screen is fixedly provided with a second connection portion, and the second connection portion and the first connection portion are fitted with one sleeving the other.

The detection circuit includes:

a second power supply;

a second resistor, where one terminal of the second resistor is electrically connected to an output terminal of the second power supply;

a metal spring, where the metal spring is fixedly disposed on the wall surface of the second connection portion, an included angle between the metal spring and the display surface of the second screen is 0 degrees, and the metal spring is electrically connected to the other terminal of the second resistor; and a metal baffle, where the metal baffle is fixedly disposed on a wall surface of the first connection portion, an included angle between the metal baffle and the display surface of the first screen is the preset angle, the metal baffle is grounded, the preset angle is greater than 0 degrees and less than or equal to 180 degrees, and the metal spring may come in contact with the metal baffle during relative rotation of the first screen and the second screen.

The obtaining the divided voltage value between the other terminal of the first resistor and the other terminal of the second conductive element when the target event is detected by the detection circuit in the angle determining circuit includes:

when it is detected that a signal state of the metal spring is changed from a third state to a fourth state, determining that the target event is detected, and obtaining the divided voltage value between the other terminal of the first resistor and the other terminal of the second conductive element.

Optionally, the calculating a second parallel resistance value of the first arc section and the second arc section based on the voltage value of the first power supply, the resistance value of the first resistor, and the obtained divided voltage value includes:

calculating the second parallel resistance value of the first arc section and the second arc section based on the voltage value of the first power supply, the resistance value of the first resistor, and the obtained divided voltage value when the obtained divided voltage value falls within a preset voltage range corresponding to the preset angle.

Optionally, the angle determining circuit further includes an ADC, and the ADC is electrically connected to a common terminal of the first resistor and the first conductive element.

The obtaining the divided voltage value between the other terminal of the first resistor and the other terminal of the second conductive element includes:

obtaining a divided voltage value obtained through sampling by the ADC.

It can be learned that, in this embodiment of this disclosure, the folding angle of the folding screen terminal is determined by using the angle determining circuit, an overall structure of the angle determining circuit is very simple, and the angle determining circuit does not include a complex mechanical structure. In addition, performance of each component in the angle determining circuit is not likely to be affected by a temperature factor. Therefore, compared with the related art, in this embodiment of this disclosure, during determining of the folding angle, the impact of the temperature factor on the determining result can be effectively avoided, thereby improving accuracy of the determined folding angle.

Figure 9:
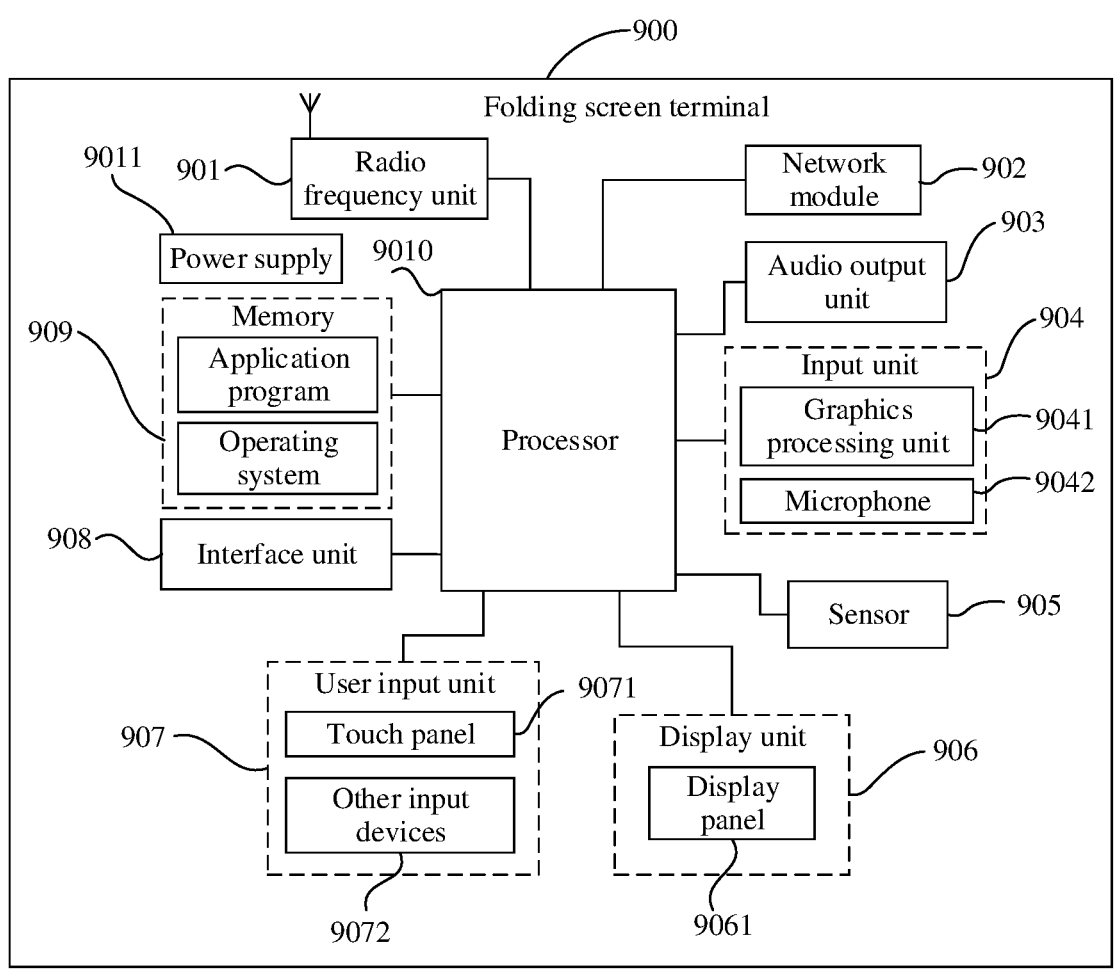
FIG. 9 is a schematic structural diagram of hardware of a folding screen terminal according to an embodiment of this disclosure.

Referring to FIG. 9, FIG. 9 is a schematic structural diagram of hardware of a folding screen terminal 900 according to the embodiments of this disclosure. As shown in FIG. 9, the folding screen terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 9010, and a power supply 9011. A person skilled in the art can understand that the structure of the folding screen terminal shown in FIG. 9 does not constitute any limitation on the folding screen terminal 900, and the folding screen terminal 900 may include more or fewer components than those shown in the figure, or a combination of some components, or the components disposed differently. In this embodiment of this disclosure, the folding screen terminal 900 includes but is not limited to a mobile phone, a tablet computer, a palmtop computer, an in-vehicle terminal, a wearable device, a pedometer, and the like. It should be noted that the folding screen terminal 900 includes a first screen and a second screen that are rotatably connected through a rotary shaft, a resistance ring is fixedly provided outside the rotary shaft, and the folding screen terminal 900 further includes an angle determining circuit. The circuit includes:

a first power supply;

a first resistor, where one terminal of the first resistor is electrically connected to an output terminal of the first power supply;

a first conductive element, where the first conductive element is fixedly disposed at the first screen, one terminal of the first conductive element is electrically connected to the other terminal of the first resistor, and the other terminal of the first conductive element slidably abuts against the resistance ring; and a second conductive element, where the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring.

The processor 9010 is configured to:

obtain a divided voltage value between the other terminal of the first resistor in the angle determining circuit and the other terminal of the second conductive element in the angle determining circuit; and determine, based on a voltage value of the first power supply in the angle determining circuit, a resistance value of the first resistor, and the obtained divided voltage value, an included angle between the first screen and the second screen of the folding screen terminal having the angle determining circuit.

In this embodiment of this disclosure, the folding angle of the folding screen terminal 900 is determined by using the angle determining circuit, an overall structure of the angle determining circuit is very simple, and the angle determining circuit does not include a complex mechanical structure. In addition, performance of each component in the angle determining circuit is not likely to be affected by a temperature factor. Therefore, compared with the related art, in this embodiment of this disclosure, during determining of the folding angle, the impact of the temperature factor on the determining result can be effectively avoided, thereby improving accuracy of the determined folding angle.

Optionally, abutting positions of the first conductive element and the second conductive element on the resistance ring divide the annular region into a first arc section and a second arc section, and the first arc section is farther away from a display surface of the first screen than the second arc section.

The processor 9010 is specifically configured to:

calculate a first parallel resistance value of the first arc section and the second arc section based on the voltage value of the first power supply in the angle determining circuit, the resistance value of the first resistor, and the obtained divided voltage value; and calculate, based on a preset resistance value of the annular region and the first parallel resistance value, the included angle between the first screen and the second screen of the folding screen terminal having the angle determining circuit.

Optionally, the angle determining circuit further includes:

a detection circuit, where the detection circuit is configured to perform detection for a target event, and the target event is an event that the included angle between the first screen and the second screen is a preset angle.

The processor 9010 is further configured to:

obtain the divided voltage value between the other terminal of the first resistor and the other terminal of the second conductive element when the target event is detected by the detection circuit in the angle determining circuit;

calculate a second parallel resistance value of the first arc section and the second arc section based on the voltage value of the first power supply, the resistance value of the first resistor, and the obtained divided voltage value;

calculate a real-time resistance value of the annular region based on the preset angle and the second parallel resistance value; and update the preset resistance value of the annular region to the calculated real-time resistance value.

Optionally, the first screen is fixedly provided with a first connection portion, the second screen is fixedly provided with a second connection portion, and the second connection portion and the first connection portion are fitted with one sleeving the other.

The detection circuit includes:

a groove-shaped optocoupler, where the groove-shaped optocoupler is fixedly disposed on a wall surface of the second connection portion, and an included angle between the groove-shaped optocoupler and a display surface of the second screen is 0 degrees; and a metal baffle, where the metal baffle is fixedly disposed on a wall surface of the first connection portion, an included angle between the metal baffle and the display surface of the first screen is the preset angle, the preset angle is greater than 0 degrees and less than or equal to 180 degrees, and the metal baffle is able to enter or exit a groove of the groove-shaped optocoupler during relative rotation of the first screen and the second screen.

The processor 9010 is specifically configured to:

when it is detected that a preset change occurs in an output state of a collector of the groove-shaped optocoupler, determine that the target event is detected, and obtain the divided voltage value between the other terminal of the first resistor and the other terminal of the second conductive element.

Optionally, the preset angle is less than 180 degrees; and the processor 9010 is specifically configured to:

when it is detected that the output state of the collector of the groove-shaped optocoupler is changed back to a first state after being changed from the first state to a second state, determine that the target event is detected;

or the preset angle is equal to 180 degrees; and the processor 9010 is specifically configured to:

when it is detected that the output state of the collector of the groove-shaped optocoupler is changed from a first state to a second state, determine that the target event is detected.

Optionally, the preset angle is less than 180 degrees; and the processor 9010 is specifically configured to:

when it is determined that the target event is detected, obtain the divided voltage value between the other terminal of the first resistor and the other terminal of the second conductive element before the output state is changed from the first state to the second state and that after the output state is changed back to the first state; and calculate the second parallel resistance value of the first arc section and the second arc section based on the voltage value of the first power supply, the resistance value of the first resistor, and an average value of the two divided voltage values.

Optionally, the first screen is fixedly provided with a first connection portion, the second screen is fixedly provided with a second connection portion, and the second connection portion and the first connection portion are fitted with one sleeving the other.

The detection circuit includes:

a second power supply;

a second resistor, where one terminal of the second resistor is electrically connected to an output terminal of the second power supply;

a metal spring, where the metal spring is fixedly disposed on the wall surface of the second connection portion, an included angle between the metal spring and the display surface of the second screen is 0 degrees, and the metal spring is electrically connected to the other terminal of the second resistor; and a metal baffle, where the metal baffle is fixedly disposed on the wall surface of the first connection portion, an included angle between the metal baffle and the display surface of the first screen is the preset angle, the metal baffle is grounded, the preset angle is greater than 0 degrees and less than or equal to 180 degrees, and the metal spring may come in contact with the metal baffle during relative rotation of the first screen and the second screen.

The processor 9010 is specifically configured to:

when it is detected that a signal state of the metal spring is changed from a third state to a fourth state, determine that the target event is detected, and obtain the divided voltage value between the other terminal of the first resistor and the other terminal of the second conductive element.

Optionally, the processor 9010 is specifically configured to:

calculate the second parallel resistance value of the first arc section and the second arc section based on the voltage value of the first power supply, the resistance value of the first resistor, and the obtained divided voltage value when the obtained divided voltage value falls within a preset voltage range corresponding to the preset angle.

Optionally, the angle determining circuit further includes an ADC, and the ADC is electrically connected to a common terminal of the first resistor and the first conductive element.

The processor 9010 is specifically configured to:

obtain a divided voltage value obtained through sampling by the ADC.

It should be understood that in this embodiment of this disclosure, the radio frequency unit 901 may be configured to: receive and transmit signals in an information receiving/sending process or a call process; and specifically, after receiving downlink data from a base station, transmit the downlink information to the processor 9010 for processing, and in addition, transmit uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The folding screen terminal provides a user with wireless broadband internet access through the network module 902, for example, helping the user to transmit and receive e-mails, browse web pages, and access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the folding screen terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or sent by the radio frequency unit 901 or the network module 902. The microphone 9042 is capable of receiving sounds and processing such sounds into audio data. The processed audio data can be converted into a format output that can be sent to a mobile communication base station through the radio frequency unit 901 in a telephone call mode.

The folding screen terminal 900 may further include at least one sensor 905, for example, an optical sensor, a motion sensor, and another sensor. Specifically, the optical sensor may include an ambient light sensor and a proximity sensor. The ambient light sensor may adjust luminance of the display panel 9061 based on brightness of ambient light, and the proximity sensor may turn off the display panel 9061 and/or backlight when the folding screen terminal 900 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the folding screen terminal, functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include a display panel 9061, and the display panel 9061 may be configured in a form of a liquid crystal display (LCD), an organic light-emitting diode (OLED), or the like.

The user input unit 907 may be configured to receive input digit or character information and generate key signal input related to user setting and function control of the folding screen terminal. Specifically, the user input unit 907 may include a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 9010, and receives and executes a command sent by the processor 9010. In addition, the touch panel 9071 may be implemented in a plurality of forms, for example, as a resistive, capacitive, infrared, or surface acoustic wave touch panel. In addition to the touch panel 9071, the user input unit 907 may further include other input devices 9072. Specifically, the other input devices 9072 may include but are not limited to a physical keyboard, a function key (such as a volume control key or a power on/off key), a trackball, a mouse, a joystick, and the like. Details are not described herein.

Further, the touch panel 9071 may cover the display panel 9061. When detecting a touch operation on or near the touch panel 9071, the touch panel 9071 transmits the touch operation to the processor 9010 to determine a type of a touch event. Then, the processor 9010 provides a corresponding visual output on the display panel 9061 based on the type of the touch event. Although in FIG. 9, the touch panel 9071 and the display panel 9061 act as two independent parts to implement input and output functions of the terminal, in some embodiments, the touch panel 9071 and the display panel 9061 may be integrated to implement the input and output functions of the terminal. This is not specifically limited herein.

The interface unit 908 is an interface between an external apparatus and the folding screen terminal 900. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 908 may be configured to receive an input (for example, data information or power) from an external apparatus and transmit the received input to one or more elements within the folding screen terminal 900, or may be configured to transmit data between the folding screen terminal 900 and the external apparatus.

The memory 909 may be configured to store software programs and various data. The memory 909 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 909 may include a high-speed random access memory, and may further include a non-volatile memory such as a disk storage device, a flash memory device, or another volatile solid-state storage device.

The processor 9010 is a control center of the folding screen terminal, and is connected to all components of the folding screen terminal by using various interfaces and lines. By running or executing a software program and/or module that is stored in the memory 909 and calling data stored in the memory 909, the processor 9010 executes various functions of the folding screen terminal and processes data, so as to perform overall monitoring on the folding screen terminal. The processor 9010 may include one or more processing units. Optionally, an application processor and a modem processor may be integrated in the processor 9010. The application processor primarily processes an operating system, user interfaces, application programs, and the like. The modem processor primarily processes radio communication. It can be understood that the modem processor may alternatively be not integrated in the processor 9010.

The folding screen terminal 900 may further include the power supply 9011 (for example, a battery) supplying power to all components. Optionally, the power supply 9011 may be logically connected to the processor 9010 through a power management system. In this way, functions such as charge management, discharge management, and power consumption management are implemented by using the power management system.

In addition, the folding screen terminal 900 includes some functional modules that are not shown. Details are not described herein.

Optionally, some embodiments of the present disclosure further provide a folding screen terminal, including a processor 9010, a memory 909, and a computer program stored in the memory 909 and capable of running on the processor 9010. When the computer program is executed by the processor 9010, the procedures in the foregoing embodiments of the angle determining method are implemented, with the same technical effect achieved. To avoid repetition, details are not described again herein.

An embodiment of this disclosure further provides a computer readable storage medium, where a computer program is stored in the computer readable storage medium. When the computer program is executed by a processor, processes of the foregoing angle determining method embodiment can be implemented. To avoid repetition, details are not described herein again. The computer readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementation manners, a person skilled in the art may clearly understand that the methods in the foregoing embodiments may be implemented by using software in combination with a necessary common hardware platform, and certainly may alternatively be implemented by using hardware. However, in most cases, the former is a preferred implementation manner. Based on such an understanding, the technical solutions of this disclosure essentially or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An angle determining circuit, applied to a folding screen terminal, wherein the folding screen terminal comprises a first screen and a second screen that are rotatably connected through a rotary shaft, a resistance ring is fixedly provided outside the rotary shaft, and the angle determining circuit comprises:
    a first power supply;
    a first resistor, wherein one terminal of the first resistor is electrically connected to an output terminal of the first power supply;
    a first conductive element, wherein the first conductive element is fixedly disposed at the first screen, one terminal of the first conductive element is electrically connected to the other terminal of the first resistor, and the other terminal of the first conductive element slidably abuts against the resistance ring;
    a second conductive element, wherein the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring; and
    a processor;
    wherein the processor is configured to obtain a divided voltage value between the other terminal of the first resistor and the other terminal of the second conductive element, and determine an included angle between the first screen and the second screen based on a voltage value of the first power supply, a resistance value of the first resistor, and the obtained divided voltage value.

2. The angle determining circuit according to claim 1, wherein abutting positions of the first conductive element and the second conductive element on the resistance ring divide the annular region into a first arc section and a second arc section, and the first arc section is farther away from a display surface of the first screen than the second arc section;
    wherein the processor is specifically configured to:
    calculate a first parallel resistance value of the first arc section and the second arc section based on the voltage value of the first power supply, the resistance value of the first resistor, and the obtained divided voltage value; and
    calculate the included angle between the first screen and the second screen based on a preset resistance value of the annular region and the first parallel resistance value.

3. The angle determining circuit according to claim 2, further comprising:
    a detection circuit, wherein the detection circuit is electrically connected to the processor, the detection circuit is configured to perform detection for a target event, and the target event is an event that an included angle between the first screen and the second screen is a preset angle;
    wherein the processor is further configured to:
    obtain the divided voltage value between the other terminal of the first resistor and the other terminal of the second conductive element when the target event is detected by the detection circuit;
    calculate a second parallel resistance value of the first arc section and the second arc section based on the voltage value of the first power supply, the resistance value of the first resistor, and the obtained divided voltage value;
    calculate a real-time resistance value of the annular region based on the preset angle and the second parallel resistance value; and
    update the preset resistance value of the annular region to the calculated real-time resistance value.

4. The angle determining circuit according to claim 3, wherein the first screen is fixedly provided with a first connection portion, the second screen is fixedly provided with a second connection portion, and the second connection portion and the first connection portion are fitted with one sleeving the other;
    the detection circuit comprises:
    a groove-shaped optocoupler, wherein the groove-shaped optocoupler is fixedly disposed on a wall surface of the second connection portion, and an included angle between the groove-shaped optocoupler and a display surface of the second screen is 0 degrees; and
    a metal baffle, wherein the metal baffle is fixedly disposed on a wall surface of the first connection portion, an included angle between the metal baffle and the display surface of the first screen is the preset angle, the preset angle is greater than 0 degrees and less than or equal to 180 degrees, and the metal baffle is able to enter or exit a groove of the groove-shaped optocoupler during relative rotation of the first screen and the second screen; and
    the processor is electrically connected to a collector of the groove-shaped optocoupler;
    wherein the processor is specifically configured to:
    when it is detected that a preset change occurs in an output state of the collector, determine that the target event is detected.

5. The angle determining circuit according to claim 4, wherein
    the preset angle is less than 180 degrees;
    wherein the processor is specifically configured to:
    when it is detected that the output state of the collector is changed back to a first state after being changed from the first state to a second state, determine that the target event is detected;
    or
    the preset angle is equal to 180 degrees;
    wherein the processor is specifically configured to:

when it is detected that the output state of the collector is changed from a first state to a second state, determine that the target event is detected.

6. The angle determining circuit according to claim 5, wherein the preset angle is less than 180 degrees;
wherein the processor is specifically configured to:
when it is determined that the target event is detected, obtain the divided voltage value between the other terminal of the first resistor and the other terminal of the second conductive element before the output state is changed from the first state to the second state and that after the output state is changed back to the first state; and
calculate the second parallel resistance value of the first arc section and the second arc section based on the voltage value of the first power supply, the resistance value of the first resistor, and an average value of the two divided voltage values.

7. The angle determining circuit according to claim 3, wherein the first screen is fixedly provided with a first connection portion, the second screen is fixedly provided with a second connection portion, and the second connection portion and the first connection portion are fitted with one sleeving the other;
the detection circuit comprises:
a second power supply;
a second resistor, wherein one terminal of the second resistor is electrically connected to an output terminal of the second power supply;
a metal spring, wherein the metal spring is fixedly disposed on a wall surface of the second connection portion, an included angle between the metal spring and a display surface of the second screen is 0 degrees, and the metal spring is electrically connected to the other terminal of the second resistor; and
a metal baffle, wherein the metal baffle is fixedly disposed on a wall surface of the first connection portion, an included angle between the metal baffle and the display surface of the first screen is the preset angle, the metal baffle is grounded, the preset angle is greater than 0 degrees and less than or equal to 180 degrees, and the metal spring may come in contact with the metal baffle during relative rotation of the first screen and the second screen; and
the processor is further electrically connected to the metal spring;
wherein the processor is specifically configured to:
when it is detected that a signal state of the metal spring is changed from a third state to a fourth state, determine that the target event is detected.

8. The angle determining circuit according to claim 7, wherein the processor is specifically configured to:
calculate the second parallel resistance value of the first arc section and the second arc section based on the voltage value of the first power supply, the resistance value of the first resistor, and the obtained divided voltage value when the obtained divided voltage value falls within a preset voltage range corresponding to the preset angle.

9. The angle determining circuit according to claim 1, further comprising:
an analog-to-digital converter (ADC), wherein the processor is electrically connected to a common terminal of the first resistor and the first conductive element through the ADC;
wherein the processor is specifically configured to obtain a divided voltage value obtained through sampling by the ADC.

10. A folding screen terminal, comprising a first screen and a second screen that are rotatably connected through a rotary shaft, wherein a resistance ring is fixedly provided outside the rotary shaft, and
wherein the folding screen terminal further comprises an angle determining circuit, and the angle determining circuit comprises:
a first power supply;
a first resistor, wherein one terminal of the first resistor is electrically connected to an output terminal of the first power supply;
a first conductive element, wherein the first conductive element is fixedly disposed at the first screen, one terminal of the first conductive element is electrically connected to the other terminal of the first resistor, and the other terminal of the first conductive element slidably abuts against the resistance ring;
a second conductive element, wherein the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring; and
a processor;
wherein the processor is configured to obtain a divided voltage value between the other terminal of the first resistor and the other terminal of the second conductive element, and determine an included angle between the first screen and the second screen based on a voltage value of the first power supply, a resistance value of the first resistor, and the obtained divided voltage value.

11. An angle determining method, applied to an angle determining circuit applied to a folding screen terminal comprising a first screen and a second screen that are rotatably connected through a rotary shaft, a resistance ring being fixedly provided outside the rotary shaft,
wherein the angle determining circuit comprises:
a first power supply;
a first resistor, wherein one terminal of the first resistor is electrically connected to an output terminal of the first power supply;
a first conductive element, wherein the first conductive element is fixedly disposed at the first screen, one terminal of the first conductive element is electrically connected to the other terminal of the first resistor, and the other terminal of the first conductive element slidably abuts against the resistance ring;
a second conductive element, wherein the second conductive element is fixedly disposed at the second screen, one terminal of the second conductive element slidably abuts against the resistance ring, the other terminal of the second conductive element is grounded, and sliding paths of the first conductive element and the second conductive element on the resistance ring are located in a same annular region in a circumferential direction of the resistance ring; and
a processor;
wherein the angle determining method comprises:
obtaining, by the processor, a divided voltage value between the other terminal of the first resistor and the other terminal of the second conductive element; and determining, by the processor based on a voltage value of the first power supply, a resistance value of the first resistor, and the obtained divided voltage value, an included angle between the first screen and the second screen.

12. The angle determining method according to claim 11, wherein abutting positions of the first conductive element and the second conductive element on the resistance ring divide the annular region into a first arc section and a second arc section, and the first arc section is farther away from a display surface of the first screen than the second arc section;
wherein
the determining, by the processor based on the voltage value of the first power supply, the resistance value of the first resistor, and the obtained divided voltage value, the included angle between the first screen and the second screen comprises:
calculating, by the processor, a first parallel resistance value of the first arc section and the second arc section based on the voltage value of the first power supply, the resistance value of the first resistor, and the obtained divided voltage value; and
calculating, by the processor based on a preset resistance value of the annular region and the first parallel resistance value, the included angle between the first screen and the second screen.

13. The angle determining method according to claim 12, wherein the angle determining circuit further comprises:
a detection circuit, wherein the detection circuit is electrically connected to the processor, the detection circuit is configured to perform detection for a target event, and the target event is an event that an included angle between the first screen and the second screen is a preset angle;
wherein
the method further comprises:
obtaining, by the processor, the divided voltage value between the other terminal of the first resistor and the other terminal of the second conductive element when the target event is detected by the detection circuit;
calculating, by the processor, a second parallel resistance value of the first arc section and the second arc section based on the voltage value of the first power supply, the resistance value of the first resistor, and the obtained divided voltage value;
calculating, by the processor, a real-time resistance value of the annular region based on the preset angle and the second parallel resistance value; and
updating, by the processor, the preset resistance value of the annular region to the calculated real-time resistance value.

14. The angle determining method according to claim 13, wherein the first screen is fixedly provided with a first connection portion, the second screen is fixedly provided with a second connection portion, and the second connection portion and the first connection portion are fitted with one sleeving the other;
the detection circuit comprises:
a groove-shaped optocoupler, wherein the groove-shaped optocoupler is fixedly disposed on a wall surface of the second connection portion, and an included angle between the groove-shaped optocoupler and a display surface of the second screen is 0 degrees; and
a metal baffle, wherein the metal baffle is fixedly disposed on a wall surface of the first connection portion, an included angle between the metal baffle and the display surface of the first screen is the preset angle, the preset angle is greater than 0 degrees and less than or equal to 180 degrees, and the metal baffle is able to enter or exit a groove of the groove-shaped optocoupler during relative rotation of the first screen and the second screen; and
the processor is electrically connected to a collector of the groove-shaped optocoupler;
wherein
the obtaining, by the processor, the divided voltage value between the other terminal of the first resistor and the other terminal of the second conductive element when the target event is detected by the detection circuit comprises:
when it is detected that a preset change occurs in an output state of a collector of a groove-shaped optocoupler, determining, by the processor, that the target event is detected, and obtaining, by the processor, the divided voltage value between the other terminal of the first resistor and the other terminal of the second conductive element.

15. The angle determining method according to claim 14, wherein
the preset angle is less than 180 degrees; and
the when it is detected that the preset change occurs in the output state of the collector of the groove-shaped optocoupler, determining, by the processor, that the target event is detected comprises:
when it is detected that the output state of the collector of the groove-shaped optocoupler is changed back to a first state after being changed from the first state to a second state, determining, by the processor, that the target event is detected;
or
the preset angle is equal to 180 degrees; and
the when it is detected that the preset change occurs in the output state of the collector of the groove-shaped optocoupler, determining, by the processor, that the target event is detected comprises:
when it is detected that the output state of the collector of the groove-shaped optocoupler is changed from a first state to a second state, determining, by the processor, that the target event is detected.

16. The angle determining method according to claim 15, wherein the preset angle is less than 180 degrees;
the determining, by the processor, that the target event is detected, and obtaining, by the processor, the divided voltage value between the other terminal of the first resistor and the other terminal of the second conductive element comprises:
determining, by the processor, that the target event is detected, and obtaining, by the processor, the divided voltage value between the other terminal of the first resistor and the other terminal of the second conductive element before the output state is changed from the first state to the second state and that after the output state is changed back to the first state; and
the calculating the second parallel resistance value of the first arc section and the second arc section based on the voltage value of the first power supply, the resistance value of the first resistor, and the obtained divided voltage value comprises:
calculating, by the processor, the second parallel resistance value of the first arc section and the second arc section based on the voltage value of the first power supply, the resistance value of the first resistor, and an average value of the two divided voltage values.

17. The angle determining method according to claim 13, wherein the first screen is fixedly provided with a first connection portion, the second screen is fixedly provided with a second connection portion, and the second connection portion and the first connection portion are fitted with one sleeving the other;

the detection circuit comprises:

a second power supply;

a second resistor, wherein one terminal of the second resistor is electrically connected to an output terminal of the second power supply;

a metal spring, wherein the metal spring is fixedly disposed on a wall surface of the second connection portion, an included angle between the metal spring and a display surface of the second screen is 0 degrees, and the metal spring is electrically connected to the other terminal of the second resistor; and a metal baffle, wherein the metal baffle is fixedly disposed on a wall surface of the first connection portion, an included angle between the metal baffle and the display surface of the first screen is the preset angle, the metal baffle is grounded, the preset angle is greater than 0 degrees and less than or equal to 180 degrees, and the metal spring may come in contact with the metal baffle during relative rotation of the first screen and the second screen; and the processor is further electrically connected to the metal spring;

wherein the obtaining, by the processor, the divided voltage value between the other terminal of the first resistor and the other terminal of the second conductive element when the target event is detected by the detection circuit comprises:

when it is detected that a signal state of the metal spring is changed from a third state to a fourth state, determining, by the processor, that the target event is detected, and obtaining, by the processor, the divided voltage value between the other terminal of the first resistor and the other terminal of the second conductive element.

18. The angle determining method according to claim 17, wherein the calculating, by the processor, the second parallel resistance value of the first arc section and the second arc section based on the voltage value of the first power supply, the resistance value of the first resistor, and the obtained divided voltage value comprises:

calculating, by the processor, the second parallel resistance value of the first arc section and the second arc section based on the voltage value of the first power supply, the resistance value of the first resistor, and the obtained divided voltage value when the obtained divided voltage value falls within a preset voltage range corresponding to the preset angle.

19. The angle determining method according to claim 11, wherein the angle determining circuit further comprises:

an analog-to-digital converter (ADC), and the processor is electrically connected to a common terminal of the first resistor and the first conductive element through the ADC, wherein the obtaining, by the processor, the divided voltage value between the other terminal of the first resistor and the other terminal of the second conductive element comprises:

obtaining, by the processor, a divided voltage value obtained through sampling by the ADC.

20. A non-transitory computer readable storage medium storing therein a computer program, wherein the computer program is configured to be executed by a processor, to implement steps of the angle determining method according to claim 11.

* * * * *